(12) United States Patent
Zhou et al.

(10) Patent No.: US 11,289,737 B2
(45) Date of Patent: Mar. 29, 2022

(54) PRE-LITHIATED POLYPHENYLENE SULFIDE, POLYPHENYLENE SULFIDE-BASED SOLID ELECTROLYTE MEMBRANE, BATTERY ELECTRODE SHEET, QUASI-SOLID-STATE LITHIUM ION BATTERY AND METHOD FOR MANUFACTURING SAME

(71) Applicant: JIANGSU UNIVERSITY, Zhenjiang (CN)

(72) Inventors: Haitao Zhou, Zhenjiang (CN); Hongquan Gao, Zhenjiang (CN); Jianchun Wu, Zhenjiang (CN); Chongchen Yu, Zhenjiang (CN); Menghao Liu, Zhenjiang (CN); Dong Hou, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/413,960

(22) PCT Filed: Nov. 20, 2020

(86) PCT No.: PCT/CN2020/130376
§ 371 (c)(1),
(2) Date: Jun. 15, 2021

(87) PCT Pub. No.: WO2021/098820
PCT Pub. Date: May 27, 2021

(65) Prior Publication Data
US 2022/0037696 A1    Feb. 3, 2022

(30) Foreign Application Priority Data

Nov. 21, 2019  (CN) .......................... 201911149824.4
Dec. 30, 2019  (CN) .......................... 201911394880.4

(Continued)

(51) Int. Cl.
*H01M 10/05*  (2010.01)
*C08G 75/14*  (2006.01)
(Continued)

(52) U.S. Cl.
CPC ........ *H01M 10/0565* (2013.01); *C08G 75/14* (2013.01); *H01M 10/0525* (2013.01);
(Continued)

(58) Field of Classification Search
None
See application file for complete search history.

(56) References Cited

FOREIGN PATENT DOCUMENTS

| CN | 103289093 A | 9/2013 |
|---|---|---|
| CN | 105932225 A | 9/2016 |

(Continued)

*Primary Examiner* — Barbara L Gilliam
*Assistant Examiner* — Angela J Martin
(74) *Attorney, Agent, or Firm* — Bayramoglu Law Offices LLC (57) ABSTRACT

A method for manufacturing a pre-lithiated polyphenylene sulfide with a high solid solubility of lithium includes; placing NMP, $Li_2S$, and LiOH into a high-pressure reactor to obtain a mixture, and heating the mixture to 150-250° C. for a high-temperature dehydration for 2-5 h, and then cooling the mixture to 100° C. and adding p-DCB to the mixture for a reaction at 150-250° C. for 80-200 min; dropwise adding hydrochloric acid in an identical amount as that of the LiOH neutralize LiOH, and removing NMP and $H_2O$ by evaporation or sublimation, to obtain a dry mixed powder; and to the dry mixed powder, adding a chloride ion complexing agent to obtain a mixture, stirring the mixture to homogeneity, and placing the mixture in a sealed reactor for a reaction at 150-250° C. for 80-200 min, followed by washing and drying, to obtain the pre-lithiated polyphenylene sulfide.

12 Claims, 9 Drawing Sheets

(30) Foreign Application Priority Data

Feb. 10, 2020 (CN) .......................... 202010084430.1
Jun. 22, 2020 (CN) .......................... 202010573661.9

(51) Int. Cl.
*H01M 10/0565* (2010.01)
*H01M 10/0525* (2010.01)

(52) U.S. Cl.
CPC ............... *H01M 2300/0082* (2013.01); *H01M 2300/0085* (2013.01)

(56) References Cited

FOREIGN PATENT DOCUMENTS

| | | |
|---|---|---|
| CN | 106450424 A | 2/2017 |
| CN | 107722274 A | 2/2018 |
| CN | 110061286 A | 7/2019 |
| CN | 110100346 A | 8/2019 |
| CN | 110211723 A | 9/2019 |
| CN | 111004404 A | 4/2020 |
| CN | 111018061 A | 4/2020 |
| CN | 111342121 A | 6/2020 |
| CN | 111864272 A | 10/2020 |
| WO | 9731589 A1 | 9/1997 |

PRE-LITHIATED POLYPHENYLENE SULFIDE, POLYPHENYLENE SULFIDE-BASED SOLID ELECTROLYTE MEMBRANE, BATTERY ELECTRODE SHEET, QUASI-SOLID-STATE LITHIUM ION BATTERY AND METHOD FOR MANUFACTURING SAME

CROSS REFERENCE TO THE RELATED APPLICATIONS

This application is the national phase entry of International Application No. PCT/CN2020/130376, filed on Nov. 20, 2020, which is based upon and claims priority to Chinese Patent Applications No. 201911149824.4, filed on Nov. 21, 2019; No. 201911394880.4, filed on Dec. 30, 2019; No. 202010084430.1, filed on Feb. 10, 2020; and No. 202010573661.9, filed on Jun. 22, 2020, the entire contents of which are incorporated herein by reference.

TECHNICAL FIELD

The present invention relates to a pre-lithiated polyphenylene sulfide, a polyphenylene sulfide-based solid electrolyte membrane, a battery electrode sheet, a quasi-solid-state lithium ion battery with a high safety and a high volumetric energy density, and a method for manufacturing the same, and belongs to the technical field of new energy materials and device manufacturing.

BACKGROUND

Firstly, solid-state lithium ion batteries have received more and more attention from industry and academia for their excellent safety performance and potential high energy density. However, the solid-state lithium ion batteries have a very low power density, which greatly limits the commercial promotion and application thereof. The key issue that urgently needs to be solved is the development of a novel solid electrolyte material with a high electrical conductivity and a good processability. The current inorganic ceramic/glass electrolytes such as $Li_5La_3Zr_2O_{12}$ and $Li_{3x}La_{2/3-x}TiO_3$, and sulfide-based electrolytes have received widespread attention for their lithium ion conductivity of up to $10^{-4}$-$10^{-2}$ S·cm$^{-1}$. However, such materials suffer from poor machinability and difficulty in film formation, and especially, the processing environment required for the sulfide-based electrolytes is extremely demanding, and thus engineering and commercialization thereof still need a long way to go. Another type of electrolytes is organic electrolytes, such as PEO and PVDF, which can be easily processed into a membrane and can be processed and produced in a roll-to-roll manner. However, such organic electrolytes have a relatively low electrical conductivity which is only $10^{-8}$-$10^{-5}$ S·cm$^{-1}$, and cannot be operated normally at room temperature, which also limits the further large-scale promotion of such materials.

Secondly, the current conventional processes for manufacturing an electrode sheet employ a wet coating process with a solvent, which has the inherent disadvantages of high porosity, low electrical conductivity, and low loading, and therefore, the manufacture of a thick electrode sheet cannot be achieved. This limits the further improvement in the energy density of lithium batteries.

Thirdly, in the current processes for manufacturing a stacked-type lithium battery, in order to achieve a high volume utilization, a thin sheet design is adopted, and therefore the electrode sheet has an increased area and a reduced thickness. However, the use of a conventional separator without a prefabricated lithium salt makes the impregnation process of the electrolyte solution difficult, and is likely to cause the uneven distribution of the electrolyte solution and lithium salt, thereby affecting the battery performance.

SUMMARY

In order to overcome the shortcomings in the prior art, the present invention provides a pre-lithiated polyphenylene sulfide, a polyphenylene sulfide-based solid electrolyte membrane, a battery electrode sheet, a quasi-solid-state lithium ion battery with a high safety, a long lifetime, and a high volumetric energy density, and a method for manufacturing the same. The solid solubility of lithium in the pre-lithiated polyphenylene sulfide-based solid electrolyte membrane material prepared by the method is high, and chloride ions in the membrane material are effectively bound, thereby allowing the membrane material to be a good conductor of single lithium ions. The prepared battery electrode sheet does not rely on a solvent, and has a high loading, and a uniform and controllable thickness. The manufactured quasi-solid-state lithium ion battery has a simplified assembly process, and has characteristics of high safety, long lifetime, and high volumetric energy density, and the impregnation of the electrolyte solution is convenient, and it is easy to manufacture a blade battery with a large area and a low thickness.

A method for manufacturing a pre-lithiated polyphenylene sulfide with a high solid solubility of lithium, characterized by including the following steps:

placing N-methylpyrrolidone (NMP), lithium sulfide ($Li_2S$), and lithium hydroxide (LiOH) into a high-pressure reactor with a stirring function to obtain a mixture, and heating the mixture to 150-250° C. for a high-temperature dehydration for 2-5 h, and then cooling the mixture to 100° C. and adding 1,4-dichlorobenzene (p-DCB) to the mixture for a reaction at 150-250° C. for 80-200 min; dropwise adding hydrochloric acid in an identical amount as that of the LiOH on a molar basis to neutralize the LiOH, and removing the NMP and $H_2O$ by evaporation or sublimation, to obtain a dry mixed powder; and to the dry mixed powder, adding a chloride ion complexing agent to obtain a mixture, stirring the mixture to homogeneity, and placing the mixture in a sealed reactor for a reaction at 150-250° C. for 80-200 min, followed by washing and drying, to obtain the pre-lithiated polyphenylene sulfide with the high solid solubility of lithium.

Further, the $Li_2S$ is formed by a high-temperature reaction of a lithium metal powder with a sulfur powder or is formed by a carbothermal reduction reaction of lithium sulfate ($Li_2SO_4$).

Further, the NMP, the lithium sulfide ($Li_2S$), and the lithium hydroxide (LiOH) are at a molar ratio of 1-5:1:0.05-0.2.

Further, the $Li_2S$ and the p-DCB are at a molar ratio of 1.3-0.8:1.

Further, the evaporation or sublimation includes a hot-air drying method, a rotary evaporation method, and a freeze-drying method, to maximize retention of solid-phase components and only remove the NMP and $H_2O$.

Further, the chloride ion complexing agent is an organic metal-ion-free complexing agent, and preferably calixcrown ether, caliximidazole, calixpyrrole, or calixarene.

Further, the chloride ion complexing agent is added in an amount on a molar basis that is 0.01-0.2 time that of the p-DCB.

Pre-lithiated polyphenylene sulfide which is prepared by the method for manufacturing the pre-lithiated polyphenylene sulfide with the high solid solubility of lithium.

A method for preparing an isotropic polyphenylene sulfide-based solid electrolyte membrane, characterized by including the following steps: mixing a pre-lithiated polyphenylene sulfide powder and polytetrafluoroethylene (PTFE) uniformly in a mixer under a temperature condition where the polytetrafluoroethylene is in a glassy state, to obtain a mixed powder, and air-grinding the mixed powder with a supersonic gas to allow a molecular chain of the PTFE to extend and open and form a physical adhesion with the pre-lithiated polyphenylene sulfide powder, without a chemical reaction; then removing the gas in the mixed powder through an extruder to form a continuous cake-like wide strip, followed by hot pressing the continuous cake-like wide strip into a pre-lithiated polyphenylene sulfide membrane material with a hot roll at a temperature lower than 150° C., and winding the pre-lithiated polyphenylene sulfide membrane material up; and preparing the polyphenylene sulfide-based solid electrolyte membrane.

Further, the pre-lithiated polyphenylene sulfide powder is the pre-lithiated polyphenylene sulfide, and the air-grinding is performed by preheating the mixed powder to 40-50° C. and then jet-drawing the PTFE with a supersonic jet gas in an apparatus for PTFE directional drawing.

Further, the PTFE directional drawing is performed by preheating the PTFE in the mixed powder through the supersonic jet gas to form a PTFE viscous fluid, jetting out the PTFE viscous fluid through a small nozzle in a form of a supersonic jet fluid under a pressurized condition, sucking the mixed powder through a structure of a Venturi tube, and collecting a resulting material in a volute-shaped chamber, with the resulting material collected becoming a spatially reticulated loose agglomerate.

Further, the pre-lithiated polyphenylene sulfide powder and the PTFE are mixed uniformly in the mixer at a temperature controlled below 10° C. for a mixing time of 0.5-4 h.

Further, after the hot pressing, the pre-lithiated polyphenylene sulfide membrane material pressed is further processed by laminating two or more sheets of the pre-lithiated polyphenylene sulfide membrane material which has been pressed once into a defect-free high-density solid electrolyte membrane by hot pressing; or hot pressing the pre-lithiated polyphenylene sulfide membrane material with two heated fluororubber modules at 150-230° C. for 1-10 seconds to heal microcracks and pores in the pre-lithiated polyphenylene sulfide membrane material which has been pressed once, to prepare a defect-free high-density solid electrolyte membrane.

A polyphenylene sulfide-based solid electrolyte membrane which is prepared by the method for preparing the polyphenylene sulfide-based solid electrolyte membrane.

A method for preparing a high-loading battery electrode sheet, characterized by including the following steps: mixing an electrically conductive carbon material and a positive electrode material or a negative electrode material for a lithium ion battery uniformly in a mixer to obtain a first mixed powder; then mixing the first mixed powder and a PTFE powder uniformly under a temperature condition where PTFE is in a glassy state to obtain a second mixed powder, and using a supersonic jet gas to allow a molecular chain of the PTFE to extend and open and form a physical adhesion with the first mixed powder of the electrically conductive carbon material and the positive electrode material or the negative electrode material for the lithium ion battery, without a chemical reaction, to obtain a resultant; forming a membrane material D by hot pressing the resultant at an elevated temperature, and then thermally laminating the membrane material D with a perforated current collector on one side by a hot press lamination process, to prepare a thick single-side-loaded positive electrode or a thick single-side-loaded negative electrode.

Further, the positive electrode material or the negative electrode material for the lithium ion battery and the electrically conductive carbon material are at a weight percent ratio of 50-95%:50-5%.

Further, the PTFE powder and the first mixed powder of the electrically conductive carbon material and the positive electrode material or the negative electrode material for the lithium ion battery are at a weight percent ratio of 3-15%: 85-97%.

Further, the hot pressing is performed at a temperature of 150-250° C.

Further, the membrane material D is thermally laminated with the perforated current collector at a rolling temperature of 120-220° C., the perforated current collector and a sheet of the membrane material D are unwound at an identical speed and introduced into two hot roller presses rotating oppositely, wherein by adjusting a roll gap width to control a pressure, the membrane material D can just be laminated on the perforated current collector, avoiding excessive deformation of the membrane material D and breakage of the perforated current collector due to an excessive roll pressure.

Further, the using of the supersonic jet gas to allow the molecular chain of the PTFE to extend and open is performed by preheating the second mixed powder to 40-50° C. and then jet-drawing the PTFE with the supersonic jet gas in an apparatus for PTFE directional drawing, and the PTFE directional drawing is performed by preheating the PTFE in the second mixed powder through the supersonic jet gas to form a PTFE viscous fluid, jetting out the PTFE viscous fluid through a small nozzle in a form of a supersonic jet fluid under a pressurized condition, sucking the second mixed powder through a structure of a Venturi tube, and collecting a resulting material in a volute-shaped chamber, with the resulting material collected becoming a spatially reticulated loose agglomerate.

Further, the electrically conductive carbon material is one selected from a group consisting of super-P, acetylene black, activated carbon, artificial graphite, and high purity graphite, or a mixture of two or more thereof; and the perforated current collector is a stainless steel foil, aluminum foil or copper foil protected by carbon coating and perforated.

A method for manufacturing a quasi-solid-state lithium ion battery with a high safety and a high volumetric energy density, characterized by including the following steps:

using the polyphenylene sulfide-based solid electrolyte membrane prepared above as an electrolyte, and using the thick single-side-loaded positive electrode and the thick single-side-loaded negative electrode prepared by the method as a positive electrode sheet and a negative electrode sheet, respectively, to assemble the quasi-solid-state lithium ion battery by stacking the positive electrode sheet, the polyphenylene sulfide-based solid electrolyte and the negative electrode sheet together sequentially, with an unloaded side of each of the current collectors of the positive electrode sheet and the negative electrode sheet facing outwards; and performing hot press lamination at 80-150° C. to form a laminate sheet layer with a "sandwich" structure, and packaging the laminate sheet layer with a packaging film, followed by injecting an electrolyte solution inside the packaging film under vacuum and heat sealing the packaging film into a case.

Further, before the packaging, a plurality of the laminate sheet layers are stacked together by a stacking machine with positive electrode current collectors being attached to each other and negative electrode current collectors being attached to each other, tab parts are welded, and then, the plurality of laminate sheet layers are packaged with the packaging film.

Further, the packaging film is an insulating flexible packaging film, and preferably an aluminum plastic film, a polyimide film, or a plastic film.

A quasi-solid-state lithium ion battery with a high safety and a high volumetric energy density which is prepared by the method for manufacturing the quasi-solid-state lithium ion battery with a high safety and a high volumetric energy density.

As compared with the prior art, the present invention possesses the following beneficial effects:

(1) Polyphenylene sulfide is employed as a carrier for the solid electrolyte, and has a good thermal stability, non-flammability, high safety, and long lifetime.

(2) The anisotropy of lithium ion transport performance in the solid electrolyte is eliminated.

The conventional pre-lithiated polyphenylene sulfide-based solid electrolyte is prepared by means of casting. During the recrystallization process of casting, crystal orientation occurs, which will cause the anisotropy of lithium ion transport performance. The lithium ion conductivity in the horizontal direction of the membrane is 1 to 2 orders of magnitude greater than the lithium ion conductivity in the vertical direction of the membrane.

In the present invention, the pre-lithiated polyphenylene sulfide powder and PTFE are mixed and then agglomerated in the apparatus for PTFE directional drawing. PTFE is preheated through the jet gas to form a PTFE viscous fluid, the PTFE viscous fluid is jetted out in the form of a supersonic jet fluid through a small nozzle under the pressurized condition, the powder of electrode materials is sucked through the structure of Venturi tube and filled in PTFE fiber clusters, and the resulting material is collected in the volute-shaped chamber, and the collected material becomes a spatially reticulated loose agglomerate. The molecular chain of long-chain PTFE is extended and opened, and the functionalized organic powder is physically adhered to the PTFE molecular chain. The gas in the powder is removed through the extruder to form a continuous cake-like wide strip which is hot pressed into a membrane at a temperature below the temperature (<150° C.) at which the physical and chemical properties of the organic powder are changed. PTFE has a high compression ratio, a high molecular weight, and long chain segments. During the preparation process, the pre-lithiated polyphenylene sulfide powder is sufficiently adhered to the molecular chain of PTFE while air-grinding with PTFE, to achieve uniform mixing. Then, the functionalized powder is wrapped through the adhesion between the PTFE molecular chains during the process of forming the continuous cake-like wide strip through the extruder. At the same time, the air can be effectively removed from the loose powder after air-grinding by first pre-forming the continuous cake-like wide strip, which is beneficial to the formation of a continuous uniform membrane. High temperature is not employed in the manufacturing process, and the processing temperature is always below the temperature at which the physical and chemical properties of the organic powder are changed. Auxiliaries such as solvents are not employed in the manufacturing process, avoiding the functional damage caused by the dissolution of the powder. Recrystallization of the functionalized powder will not occur, and the anisotropy will not occur during the manufacturing process of the membrane material, and it is easy to manufacture a dense membrane material, especially for organic solid electrolyte membranes, it can be ensured that the membrane materials have excellent ionic conductivity characteristics in all directions. The whole process is a physical process, in which the pre-lithiated polyphenylene sulfide powder will not undergo chemical reaction, and its physical and chemical properties will not change. Therefore, the prepared functional membrane material has desirable catalytic, metal ion exchange or proton exchange performance.

That is, the pre-lithiated polyphenylene sulfide-based solid electrolyte in the present invention is prepared by a low-temperature damage-free manufacturing method, and the lithium ion conductivity of the membrane material does not have the anisotropy. Therefore, the present invention is particularly suitable for the preparation of a membrane material where the pre-lithiated polyphenylene sulfide powder is not suitable for film formation by methods such as injection molding or casting, or the effect of the high temperature or solvent will damage the function of the organic powder, or anisotropy is produced during the membrane manufacturing and affects the performance of the membrane material.

(3) During the pre-lithiation process of polyphenylene sulfide, nanoscale uniform mixing of lithium ions with polyphenylene sulfide is realized, the lithium ion migration channel and the solid solubility of lithium are increased, and the electrical conductivity of pre-lithiated polyphenylene sulfide is improved.

In the pre-lithiation of polyphenylene sulfide, LiOH is added first for the purpose of better dehydration of the system. The reaction between $Li_2S$ and p-DCB is a nucleophilic substitution reaction. The aprotic polarity is conducive to the reaction, but $H_2O$ can have a solvation effect with $Li_2S$, thereby weakening its nucleophilic effect and reducing the monomer reactivity. Therefore, better dehydration can improve the yield of the linear crystallized region of polyphenylene sulfide, and a sufficiently high ratio of the linear region can ensure the presence of a large number of fast migration channels for lithium ions in the structure. Then, the solvent and water are directly evaporated or sublimated to realize the conversion of resultants to reactants in one step, and realize nanoscale mixing of polyphenylene sulfide with the lithium salt in situ, promoting the subsequent sufficient high-temperature solid solution reaction. Highly crystalline polyphenylene sulfide has a high hardness and high strength and is difficult to break and is difficult to prepare a nanoscale polyphenylene sulfide powder. If a coarse polyphenylene sulfide powder and a lithium salt are simply mixed and heated, then the reaction will be non-uniform, the solid solubility of lithium will be low and the electrical conductivity will be low. Thirdly, the chloride ion complexing agent added can effectively separate lithium ions from chloride ions, promote the capture of lithium ions by sulfur sites on the chain of polyphenylene sulfide, and improve the solid solubility of lithium, thereby improving the electrical conductivity of pre-lithiated polyphenylene sulfide. At the same time, due to the pinning effect of the chloride ion complexing agent on chloride ions, under the action of electric field, only lithium ions can undergo directional migration in the crystal structure of pre-lithiated polyphenylene sulfide, while chloride ions cannot move, allowing the pre-lithiated polyphenylene sulfide to be an excellent conductor of single lithium ions, and further improving the lithium ion conductivity of pre-lithiated polyphenylene sulfide. The pinning effect of the chloride ion complexing agent on chloride ions can also prevent chloride ions from participating in the electrochemical reaction, corroding the current collector, and causing the battery capacity to decrease.

At the same time, in the pre-lithiation method, the manufacturing equipment used is simple and convenient to operate, and the whole process has no pollution to the environment. Recovered NMP can be reused after purification, and the cleaning filtrate is an excess LiCl solution, which also has a relatively high recovery value.

(4) Two or more layers of functional membranes are laminated by hot pressing to form a lithium ion solid electrolyte membrane material, so that not only the strength, toughness, and flatness of the membrane material can be increased, but also defects that damage functions of the membrane material, such as voids, cracks, and non-uniform thickness of the membrane material can be eliminated to the greatest extent, and especially, the precipitation of metal dendrites on the surface in the battery caused by the non-uniform thickness of the membrane material during the cycling process can be prevented. The present invention can continuously manufacture micron-sized organic membrane materials in a roll-to-roll manner. At the same time, in the manufacturing method, the manufacturing equipment used is simple and convenient to operate, no solvent drying process is performed, the energy consumption is low, no secondary pollution is caused during use, and the cleaning is convenient.

(5) The manufacture of high-loading battery electrode sheets is independent of a solvent and has excellent practicability.

Compared with the currently used wet coating of electrode sheets, in the method for preparing a high-loading battery electrode sheet according to the present invention, the electrode sheet has a high loading of electrode active material, a uniform and controllable thickness, a high strength, a good corrosion resistance, and a high electrical conductivity, and can realize thick membrane loading on various current collectors. Loading on one side of the current collector and perforating the current collector is to ensure the good impregnation for the electrolyte solution. At the same time, in the manufacturing method, the manufacturing equipment used is simple and convenient to operate, no secondary pollution is caused during use, and the cleaning is convenient. In the true sense, the electrode sheet is an ion sieve cathode with easy processing, corrosion resistance, a stable structure, a long lifetime, an appropriate cost of the raw material, and a strong practicability.

(6) During the process of manufacturing the quasi-solid-state lithium ion battery in the present invention, the volume ratio of the active material loading is greatly increased to 30%-50%. The gap between the two attached current collectors and the pore paths on the current collectors are the impregnation channels for the electrolyte solution, which can better realize the wetting of the thick electrode loading by the electrolyte solution. Since the solid electrolyte does not need impregnation compared with the conventional polymer separators, the overall injection of the electrolyte solution in the battery is significantly reduced, and there is no flowable electrolyte solution inside the battery. Moreover, the solid electrolyte itself contains lithium, so that the content of the toxic fluorine-containing lithium salt in the electrolyte solution is also greatly reduced, and the battery is more environmentally friendly. The pre-lithiated polyphenylene sulfide membrane material with a high solid solubility of lithium has a high-temperature decomposition temperature which is much higher than that of the conventional polymer separators, and thus has a further improved safety performance.

(7) In the single-piece laminate sheet layer with "sandwich" structure made by hot pressing, the battery electrode sheets, and the solid electrolyte are bonded into a whole, which has a good flexibility, and is not easy to be dislocated under repeated bending, and can be made into an ultra-thin flexible quasi-solid-state battery for use in a wearable electronic device.

(8) The polyphenylene sulfide-based solid electrolyte itself has a quite good flame retardant property and a good thermal stability, and does not decompose at 400° C. Therefore, the amount of the electrolyte solution used is greatly reduced, the flammable materials inside the battery are also reduced, and the safety performance of the battery is improved, without burning or exploding in the case of nail penetration.

1—Perforated carbon-coated layer, 2—perforated current collector, 3—thick electrode membrane, 301—thick positive electrode membrane, 302—thick negative electrode membrane, 4—pre-lithiated polyphenylene sulfide-based solid electrolyte, and 5—electrolyte impregnation channel.

DETAILED DESCRIPTION OF THE EMBODIMENTS

In order to make the technical solutions of the present invention clearer, the technical solutions of the present invention will be described clearly and completely below. It is obvious that the examples described are part of the examples of the present invention, rather than all of them.

The quasi-solid-state lithium ion battery according to the present invention is composed of a laminate sheet layer with a "sandwich" structure. According to the design requirement for the battery capacity, the number of the sheet layers is determined, and the sheet layers are stacked together. Two perforated current collectors attached form the impregnation paths for the electrolyte solution. The laminate sheet layer with the "sandwich" structure is formed by hot pressing a thick single-side-loaded positive electrode, a solid electrolyte, and a thick single-side-loaded negative electrode. The thick single-side-loaded positive electrode is prepared by a manufacturing method independent of a solvent, including preheating a variety of carbon materials, an electrode active material and PTFE in supersonic jet gas, performing PTFE directional drawing to allow the molecular chain of PTFE to extend and open, then forming a membrane through multi-step rolling, and finally laminating the membrane with the perforated carbon-coated current collector through hot pressing. The solid electrolyte is a pre-lithiated polyphenylene sulfide membrane material with a high solid solubility of lithium. The pre-lithiated polyphenylene sulfide powder with a high solid solubility of lithium and PTFE are subjected to jet-drawing with supersonic jet gas in an apparatus for PTFE directional drawing, and extruded to remove the gas to form a cake. After primary rolling and lamination rolling of multiple membranes, the pre-lithiated polyphenylene sulfide membrane material is prepared.

PTFE is selected as the polymer binder. Because the PTFE powder has a high compression ratio, a high molecular weight, and long chain segments, its molecular chain can quickly unfold and form a spatial network by grinding with supersonic air, to adhere and wrap the powder, which is conducive to the uniform distribution and adhesion of the powder, and is more conducive to film formation.

All the film formation steps in the process for manufacturing the quasi-solid-state lithium ion battery are independent of a solvent, which greatly simplifies the battery manufacturing process and makes the process mom environmentally friendly. The solid solubility of lithium in the pre-lithiated polyphenylene sulfide-based solid electrolyte membrane material prepared is high, and chloride ions in the membrane material are effectively bound, thereby allowing the membrane material to be a good conductor of single lithium ions. The prepared battery electrode sheet does not rely on a solvent, and has a high loading, and a uniform and controllable thickness. The manufactured quasi-solid-state lithium ion battery has a simplified assembly process, and has characteristics of high safety, long lifetime, and high volumetric energy density, and the impregnation of the electrolyte solution is convenient, and it is easy to manufacture a blade battery with a large area and a low thickness.

Figure 1:
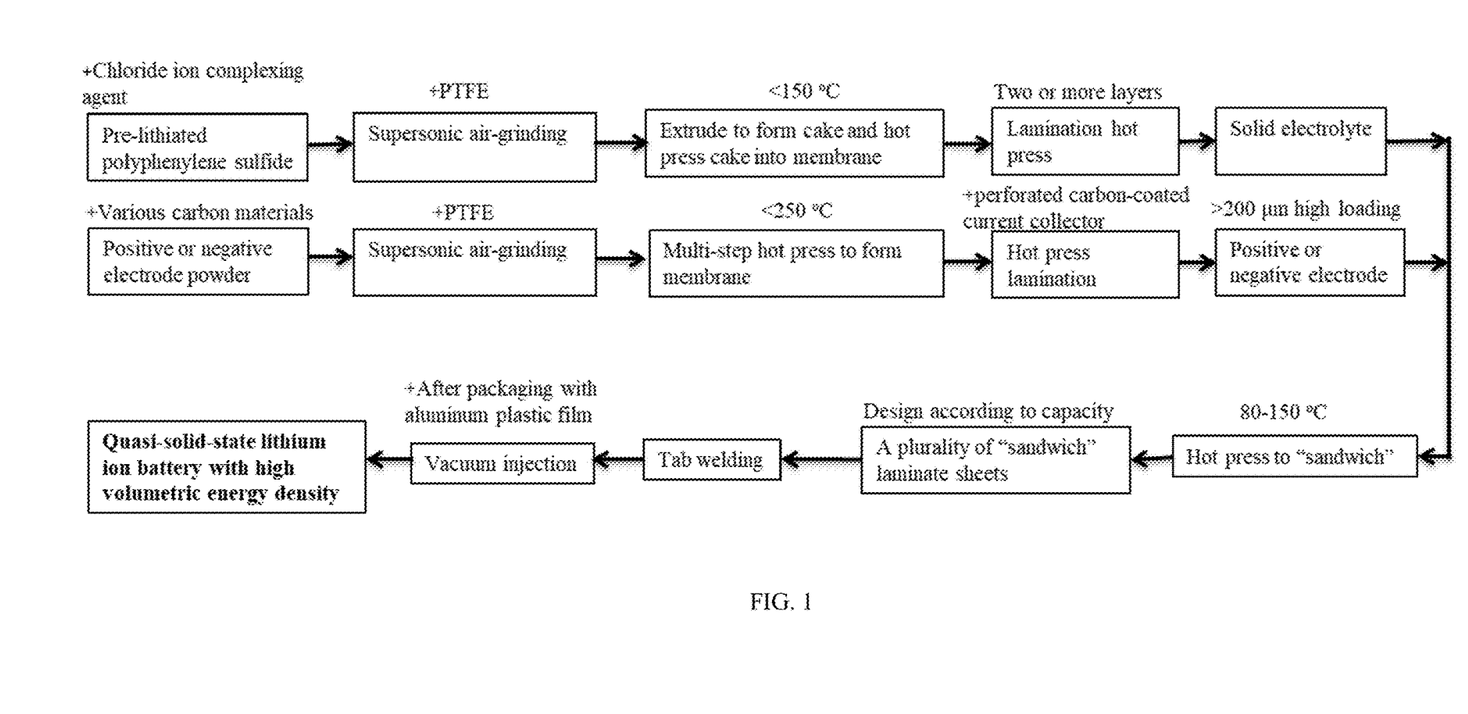
FIG. 1 is a process flow chart of a method for manufacturing a quasi-solid-state lithium ion battery with a high safety and a high volumetric energy density as described in the present invention.

The overall process flow of the method for manufacturing the quasi-solid-state lithium ion battery with a high safety and a high volumetric energy density according to the present invention is shown in FIG. 1 and will be explained below in detail in combination with examples.

Example 1

(1) Preparation of a Pre-Lithiated Polyphenylene Sulfide Membrane Material with a High Solid Solubility of Lithium:

N-methylpyrrolidone (NMP), lithium sulfide ($Li_2S$), and lithium hydroxide (LiOH) at a ratio of 3:1:0.1 on a molar basis were placed into a high-pressure reactor with a stirring function, and heated to 200° C. for high-temperature dehydration for 4 h, to obtain a dehydrated system. Secondly, the dehydrated system was cooled to 100° C., and 1,4-dichlorobenzene (p-DCB) was added at a ratio of p-DCB to $Li_2S$ of 1:1 on a molar basis. Reaction was allowed to proceed at 220° C. for 130 min, to obtain a mixed slurry. Thirdly, a predetermined amount of hydrochloric acid was added dropwise to the mixed slurry, where the amount of HCl was the same as that of LiOH on a molar basis, to exactly neutralize LiOH. NMP and $H_2O$ were removed from the mixed slurry by evaporation or sublimation, to obtain a dry mixed powder. To the mixed powder, calixcrown ether was added in an amount on a molar basis that is 0.17 time that of p-DCB, and stirred uniformly to obtain a mixture. The mixture was placed into a sealed reactor and kept at 210° C. for 160 min, to obtain a powder. Finally, the powder obtained from the above reaction was washed with deionized water under stirring for a predetermined period of time and then filtered, to obtain a filter cake. The filter cake was washed and dried again to obtain the pre-lithiated polyphenylene sulfide with a high solid solubility of lithium as the final product. The pre-lithiated polyphenylene sulfide powder and a PTFE powder were mixed at a weight percent ratio of 94%:6%, and PTFE in the mixture was subjected to jet-drawing in the apparatus for PTFE directional drawing with dry compressed air preheated at 50° C. with air flow rate reaching supersonic speed, to form a spatially reticulated loose micelle which then was collected. The powder was made into a continuous cake-like wide strip through an extruder, and then the continuous cake-like wide strip was subjected to lamination rolling several times through a hot roller press, to manufacture a membrane. The final thickness of the membrane material was 35 μm, and the lithium ion conductivity of the manufactured membrane material was $7*10^{-4}$ $S·cm^{-1}$.

Figure 2:
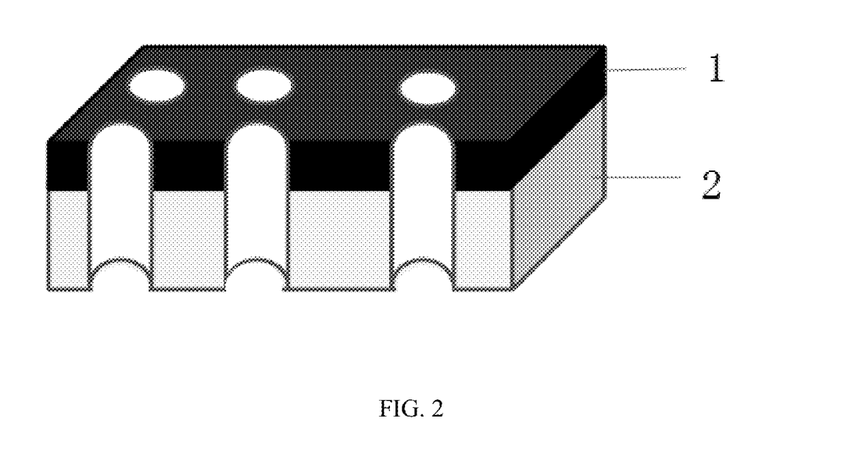
FIG. 2 is a schematic diagram of a perforated carbon-coated current collector.
Figure 3:
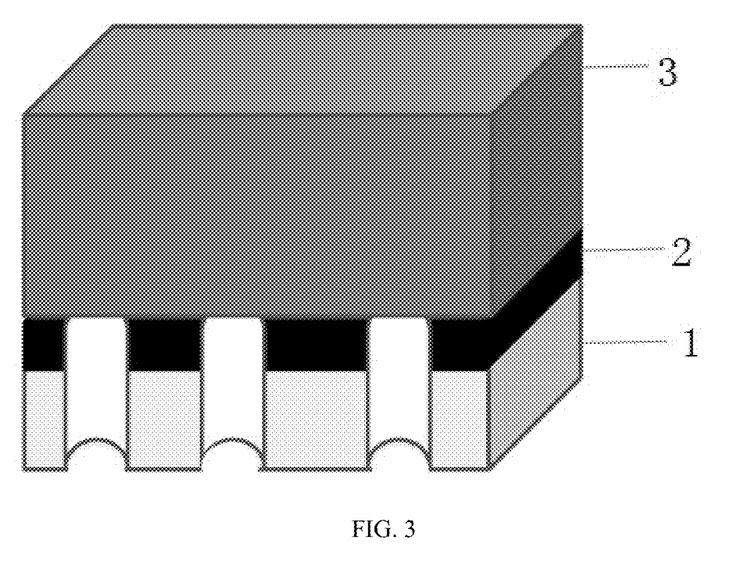
FIG. 3 is a schematic diagram of a single-side-loaded electrode in which an electrode membrane is thermally laminated with a perforated carbon-coated current collector.

(2) Preparation of a High-Loading Battery Electrode Sheet by a Method Independent of a Solvent:

$LiNi_{0.5}Co_{0.2}Mn_{0.3}O_2$ as the positive electrode active material or graphite as the negative electrode active material was mixed uniformly with artificial graphite, activated carbon and acetylene black at a weight percent ratio of 86%:7%:5%:2% in a VC-type high-efficiency asymmetric mixer to obtain a powder A. In a low-temperature cold storage at 5° C., the polytetrafluoroethylene granular powder was mixed uniformly with the above mixed powder A at a weight percent ratio of 6%:94% in a V-type mixer for 2 h, to obtain a powder B. PTFE in the powder B was subjected to jet-drawing in the apparatus for PTFE directional drawing with dry compressed air preheated at 50° C. with air flow rate reaching supersonic speed, to form a spatially reticulated loose micelle which then was collected, to prepare a mixed powder C, and the ground mixed powder C was discharged with the air flow and collected. The mixed powder C was rolled twice through a hot roller press to form a membrane at a hot-pressing temperature of 180° C. After the first rolling, the thickness of the positive electrode membrane was about 500 μm, and the thickness of the negative electrode membrane was about 300 μm. After the second rolling, the thickness of the positive electrode membrane was about 250 μm, and the thickness of the negative electrode membrane was about 120 μm. The positive electrode $LiNi_{0.5}Co_{0.2}Mn_{0.3}O_2$ membrane and the negative electrode graphite membrane were thermally laminated respectively onto one side of a perforated carbon-coated aluminum foil and perforated carbon-coated copper foil through a hot press lamination roll at a temperature of 160° C., to prepare a thick single-side-loaded $LiNi_{0.5}Co_{0.2}Mn_{0.3}O_2$ positive electrode, and a thick single-side-loaded graphite negative electrode, respectively. The structure of the above perforated carbon-coated aluminum foil or perforated carbon-coated copper foil is shown in FIG. 2. The structure of the thick single-side-loaded $LiNi_{0.5}Co_{0.2}Mn_{0.3}O_2$ positive electrode and the thick single-side-loaded graphite negative electrode manufactured is shown in FIG. 3.

Figure 4:
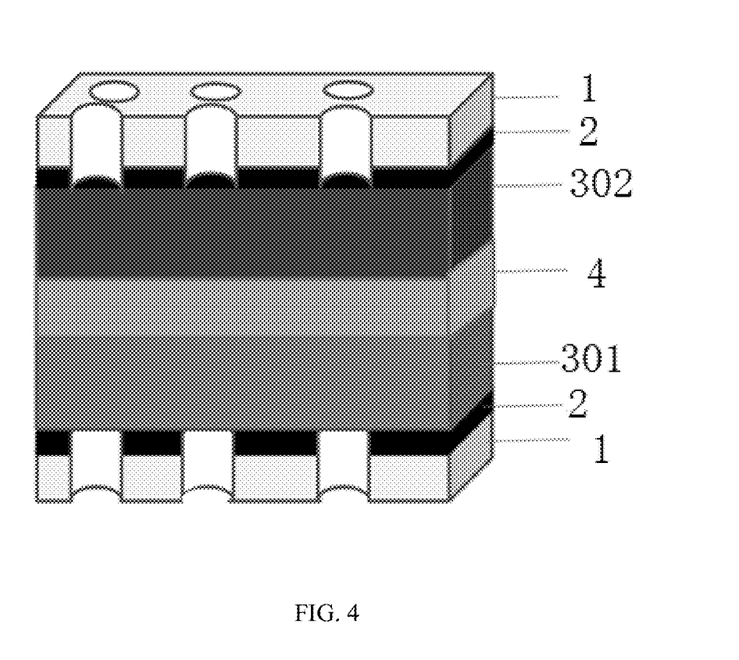
FIG. 4 is a structural representation of a laminate sheet layer with a "sandwich" structure.
Figure 5:
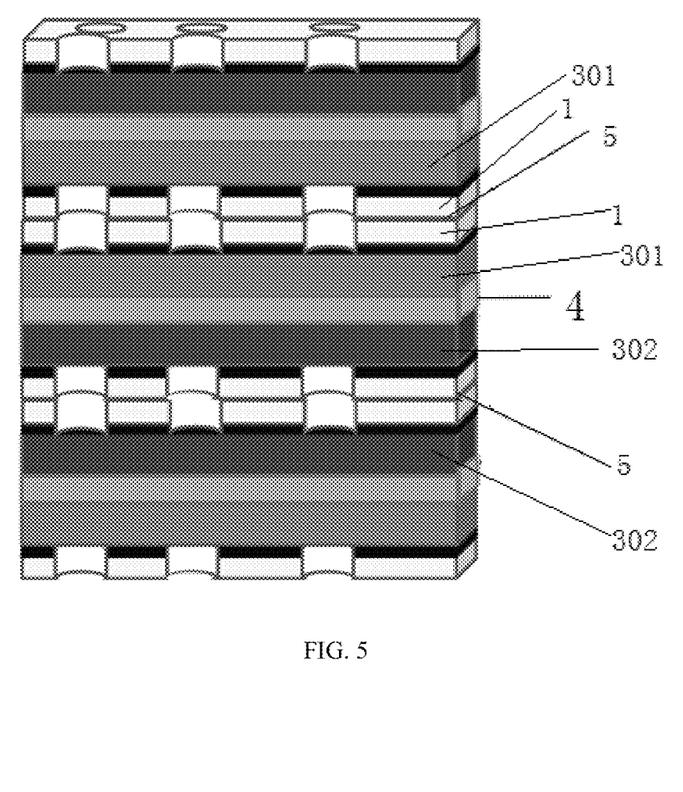
FIG. 5 is a schematic diagram of a battery stack and impregnation channels for electrolyte solution.
Figure 6:
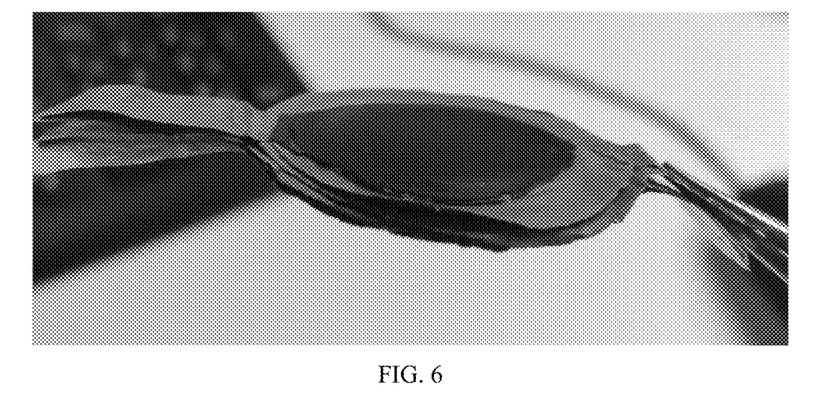
FIG. 6 is a structural representation of a stack of 5 laminate sheet layers with "sandwich" structure.
Figure 7A:
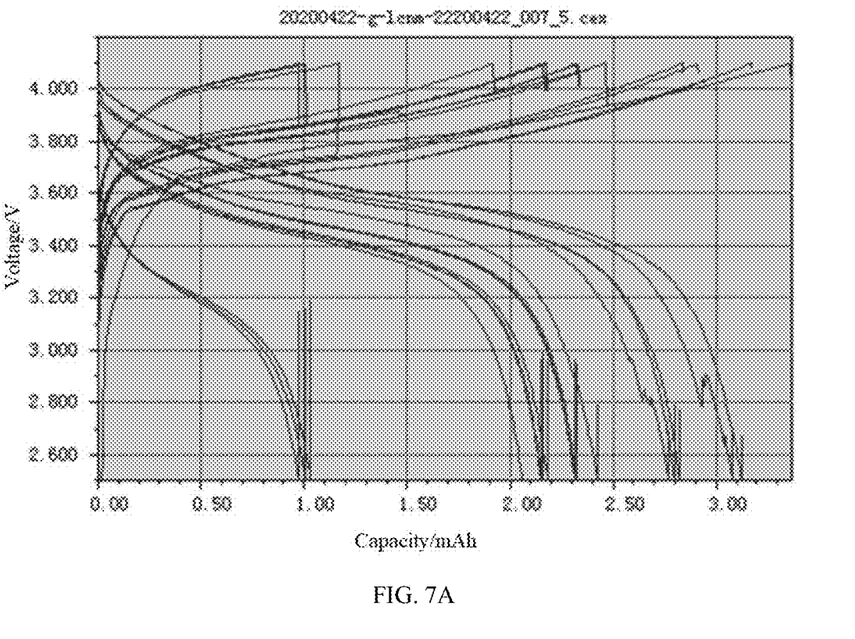
FIG. 7A and FIG. 7B show charge/discharge curves of a $LiNi_{0.5}Co_{0.2}Mn_{0.3}O_2$/graphite quasi-solid-state battery at the room temperature of 25° C. and different current densities.
Figure 7B:
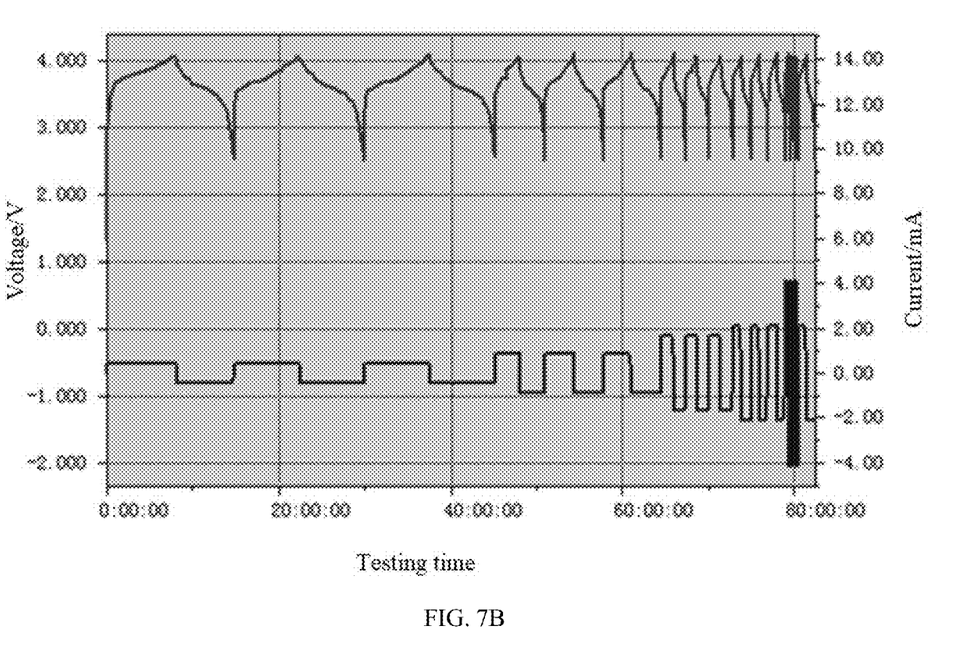
Figure 8:
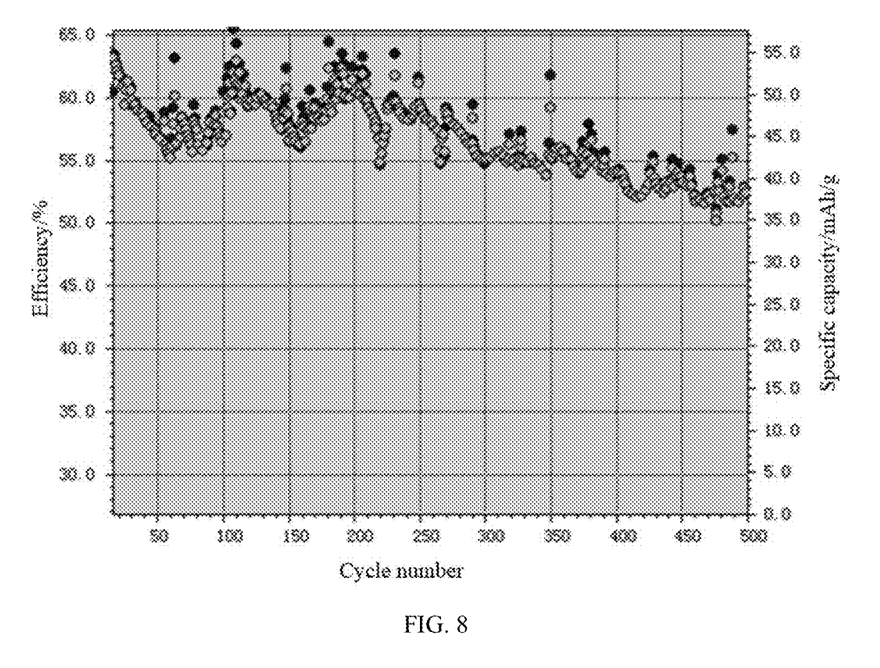
FIG. 8 is a cycle diagram of a $LiNi_{0.5}Co_{0.2}Mn_{0.3}O_2$/graphite quasi-solid-state battery at the room temperature of 25° C. and 1C.

(3) Assembly of a Quasi-Solid-State Lithium Ion Battery:

Using the thick single-side-loaded $LiNi_{0.5}Co_{0.2}Mn_{0.3}O_2$ positive electrode as a positive electrode sheet, and the thick single-side-loaded graphite negative electrode as a negative electrode sheet, the positive electrode sheet, the pre-lithiated polyphenylene sulfide membrane material with a high solid solubility of lithium, and the negative electrode sheet were stacked together sequentially, with the unloaded side of each of the current collectors of the positive electrode sheet and the negative electrode sheet facing outwards, followed by hot press lamination at 100° C. to form a laminate sheet layer with a "sandwich" structure, as shown in FIG. 4. Then, 5 laminate sheet layers with "sandwich" structure were stacked together by a stacking machine, as shown in FIGS. 5 and 6, where the aluminum current collectors of the positive electrodes were attached to each other, and the copper current collectors of the negative electrodes were attached to each other. The pore paths on the current collector and the gap between two current collectors formed electrolyte solution impregnation channels 5. The tab parts were welded, and packaging was performed with an aluminum plastic film, followed by injecting a carbonate-based electrolyte solution inside the aluminum plastic film under vacuum and heat sealing the aluminum plastic film into a case. The charge/discharge curves of the quasi-solid-state battery at the room temperature of 25° C. and different current densities are shown in FIG. 7A and FIG. 7B. The cycle performance of the quasi-solid-state battery at 1C is shown in FIG. 8, without capacity reduction after 500 cycles. No ignition or exploding occurred in the nail penetration test.

Example 2

(1) Preparation of a Pre-Lithiated Polyphenylene Sulfide Membrane Material with a High Solid Solubility of Lithium:

N-methylpyrrolidone (NMP), lithium sulfide ($Li_2S$), and lithium hydroxide (LiOH) at a ratio of 4:1:0.15 on a molar basis were placed into a high-pressure reactor with a stirring function, and heated to 200° C. for high-temperature dehydration for 4 h, to obtain a dehydrated system. Secondly, the dehydrated system was cooled to 100° C., and 1,4-dichlorobenzene (p-DCB) was added at a ratio of p-DCB to $Li_2S$ of 1:1.2 on a molar basis. Reaction was allowed to proceed at 220° C. for 130 min, to obtain a mixed slurry. Thirdly, a predetermined amount of hydrochloric acid was added dropwise to the mixed slurry, where the amount of HCl was the same as that of LiOH on a molar basis, to exactly neutralize LiOH. NMP and $H_2O$ were removed from the mixed slurry by evaporation or sublimation, to obtain a dry mixed powder. To the mixed powder, caliximidazole was added in an amount on a molar basis that is 0.05 time that of p-DCB, and stirred uniformly to obtain a mixture. The mixture was placed into a sealed reactor and kept at 210° C. for 160 min, to obtain a powder. Finally, the powder obtained from the above reaction was washed with deionized water under stirring for a predetermined period of time and then filtered, to obtain a filter cake. The filter cake was washed and dried again to obtain the pre-lithiated polyphenylene sulfide with a high solid solubility of lithium as the final product. The pre-lithiated polyphenylene sulfide powder and a PTFE powder were mixed at a weight percent ratio of 94%:6%, and PTFE in the mixture was subjected to jet-drawing in the apparatus for PTFE directional drawing with dry compressed air preheated at 50° C. with air flow rate reaching supersonic speed, to form a spatially reticulated loose micelle which then was collected. The powder was made into a continuous cake-like wide strip through an extruder, and then the continuous cake-like wide strip was subjected to lamination rolling several times through a hot roller press, to manufacture a membrane. The final thickness of the membrane material was 52 μm, and the lithium ion conductivity of the manufactured membrane material was $1*10^{-3}$ S·cm$^{-1}$.

(2) Preparation of a High-Loading Battery Electrode Sheet by a Method Independent of a Solvent:

$LiCoO_2$ as the positive electrode active material or $Li_4Ti_5O_{12}$ as the negative electrode active material was mixed uniformly with artificial graphite, activated carbon and acetylene black at a weight percent ratio of 89%:6%: 4%:1% in a VC-type high-efficiency asymmetric mixer to obtain a powder A. In a low-temperature cold storage at 5° C., the polytetrafluoroethylene granular powder was mixed uniformly with the above mixed powder A at a weight percent ratio of 6%:94% in a V-type mixer for 2 h, to obtain a powder B. PTFE in the powder B was subjected to jet-drawing in the apparatus for PTFE directional drawing with dry compressed air preheated at 50° C. with air flow rate reaching supersonic speed, to form a spatially reticulated loose micelle which then was collected, to prepare a mixed powder C, and the mixed powder C was rolled twice through a hot roller press to form a membrane at a hot pressing temperature of 180° C. After the first rolling, the thickness of the positive electrode membrane was about 450 μm, and the thickness of the negative electrode membrane was about 550 μm. After the second rolling, the thickness of the positive electrode membrane was about 220 m, and the thickness of the negative electrode membrane was about 300 μm. An aluminum foil was used as the current collector, which was coated with carbon and perforated, as shown in FIG. 2. The positive electrode $LiCoO_2$ membrane or the negative electrode $Li_4Ti_5O_{12}$ membrane was thermally laminated onto one side of the perforated carbon-coated aluminum foil through a hot press lamination roll at a temperature of 160° C., as shown in FIG. 3, to prepare a thick single-side-loaded $LiCoO_2$ positive electrode, or a thick single-side-loaded $Li_4Ti_5O_{12}$ negative electrode.

Figure 9A:
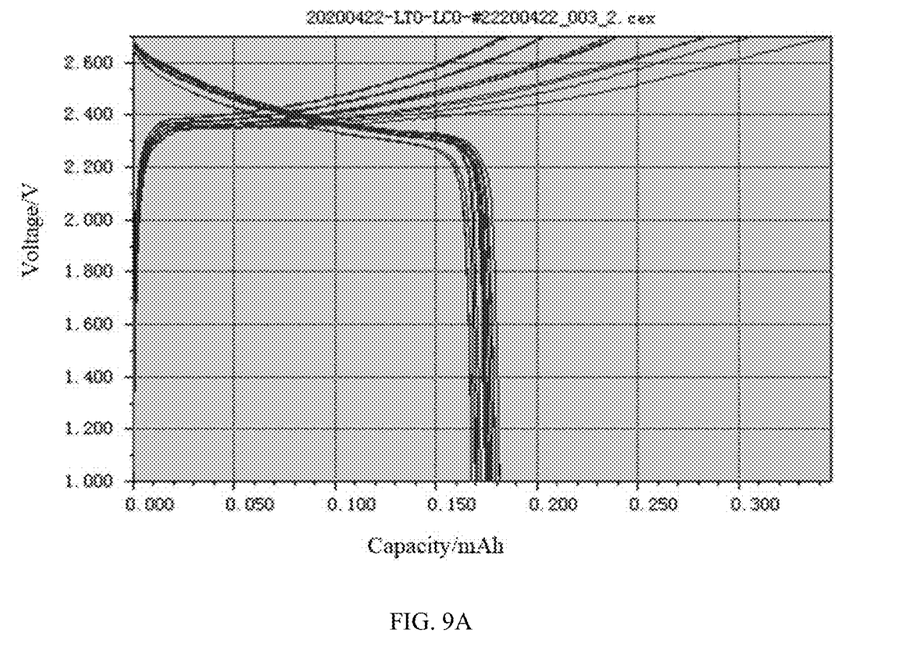
FIG. 9A and FIG. 9B show charge/discharge curves of a $LiCoO_2/Li_4Ti_5O_{12}$ quasi-solid-state battery at the room temperature of 25° C. and different current densities.
Figure 9B:
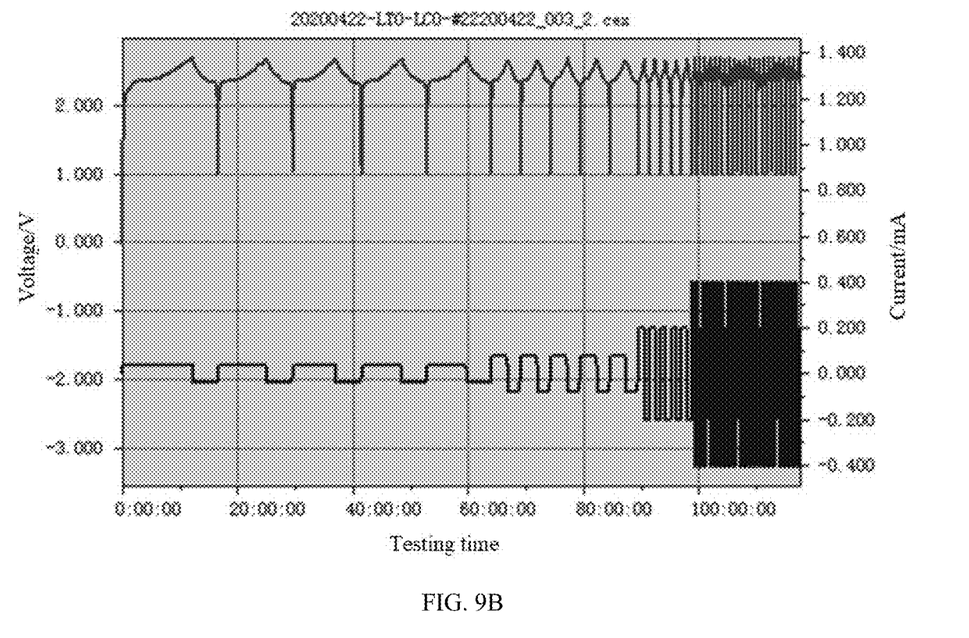

(3) Assembly of a Quasi-Solid-State Lithium Ion Battery:

Using the thick single-side-loaded $LiCoO_2$ positive electrode as a positive electrode sheet, and the thick single-side-loaded $Li_4Ti_5O_{12}$ negative electrode as a negative electrode sheet, the positive electrode sheet, the pre-lithiated polyphenylene sulfide membrane material with a high solid solubility of lithium, and the negative electrode sheet were stacked together sequentially, with the unloaded side of the current collectors of the positive electrode sheet and the negative electrode sheet facing outwards, followed by hot press lamination at 100° C. to form a laminate sheet layer with a "sandwich" structure, as shown in FIG. 4. Then, 10 laminate sheet layers with "sandwich" structure were stacked together by a stacking machine, where the aluminum current collectors of the positive electrodes were attached to each other, and the copper current collectors of the negative electrodes were attached to each other, as shown in FIGS. 5 and 6. The tab parts were welded and packaging was performed with an aluminum plastic film, followed by injecting a carbonate-based electrolyte solution inside the aluminum plastic film under vacuum and heat sealing the aluminum plastic film into a case. The charge/discharge curves of the quasi-solid-state battery at the room temperature of 25° C. and different current densities are shown in FIG. 9A and FIG. 9B. The capacity retention at 1C was as high as 90%. The battery has an excellent rate performance.

Example 3

(1) Preparation of a Pre-Lithiated Polyphenylene Sulfide Membrane Material with a High Solid Solubility of Lithium:

N-methylpyrrolidone (NMP), lithium sulfide ($Li_2S$), and lithium hydroxide (LiOH) at a ratio of 5:1:0.18 on a molar basis were placed into a high-pressure reactor with a stirring function, and heated to 200° C. for high-temperature dehydration for 4 h, to obtain a dehydrated system. Secondly, the dehydrated system was cooled to 100° C., and 1,4-dichlorobenzene (p-DCB) was added at a ratio of p-DCB to $Li_2S$ of 1:0.9 on a molar basis. Reaction was allowed to proceed at 220° C. for 130 min, to obtain a mixed slurry. Thirdly, a predetermined amount of hydrochloric acid was added dropwise to the mixed slurry, where the amount of HCl was the same as that of LiOH on a molar basis, to exactly neutralize LiOH. NMP and $H_2O$ were removed from the mixed slurry by evaporation or sublimation, to obtain a dry mixed powder. To the mixed powder, calixpyrrole was added in an amount on a molar basis that is 0.2 time that of p-DCB, and stirred uniformly to obtain a mixture. The mixture was placed into a sealed reactor and kept at 210° C. for 160 min, to obtain a powder. Finally, the powder obtained from the above reaction was washed with deionized water under stirring for a predetermined period of time and then filtered, to obtain a filter cake. The filter cake was washed and dried again to obtain the pre-lithiated polyphenylene sulfide with a high solid solubility of lithium as the final product. The pre-lithiated polyphenylene sulfide powder and a PTFE powder were mixed at a weight percent ratio of 94%:6%, and PTFE in the mixture was subjected to jet-drawing in the apparatus for PTFE directional drawing with dry compressed air preheated at 50° C. with air flow rate reaching supersonic speed, to form a spatially reticulated loose micelle which then was collected. The powder was made into a continuous cake-like wide strip through an extruder, and then the continuous cake-like wide strip was subjected to lamination rolling several times through a hot roller press, to manufacture a membrane. The final thickness of the membrane material was 37 μm, and the lithium ion conductivity of the manufactured membrane material was $8.2*10^{-4}$ $S \cdot cm^{-1}$.

(2) Preparation of a High-Loading Battery Electrode Sheet by a Method Independent of a Solvent:

$LiNi_{1.5}Mn_{0.5}O_4$ as the positive electrode active material or $Li_4Ti_5O_{12}$ as the negative electrode active material was mixed uniformly with artificial graphite, activated carbon and acetylene black at a weight percent ratio of 89%:6%:4%:1% in a VC-type high-efficiency asymmetric mixer to obtain a powder A. In a low-temperature cold storage at 5° C., the polytetrafluoroethylene granular powder was mixed uniformly with the above mixed powder A at a weight percent ratio of 6%:94% in a V-type mixer for 2 h, to obtain a powder B. PTFE in the powder B was subjected to jet-drawing in the apparatus for PTFE directional drawing with dry compressed air preheated at 50° C. with air flow rate reaching supersonic speed, to form a spatially reticulated loose micelle which then was collected, to prepare a mixed powder C. The mixed powder C was rolled twice through a hot roller press to form a membrane at a hot-pressing temperature of 150° C. After the first rolling, the thickness of the positive electrode membrane was about 500 μm, and the thickness of the negative electrode membrane was about 500 μm. After the second rolling, the thickness of the positive electrode membrane was about 280 μm, and the thickness of the negative electrode membrane was about 280 μm. The positive electrode graphite membrane was thermally laminated onto one side of the perforated carbon-coated aluminum foil at a thermal lamination rolling temperature of 160° C.

(3) Assembly of a Quasi-Solid-State Lithium Ion Battery:

The solvent-independent high-loading battery $LiNi_{1.5}Mn_{0.5}O_4$ single-side-loaded positive electrode sheet, $Li_4Ti_5O_{12}$ negative electrode, and the pre-lithiated polyphenylene sulfide membrane material with a high solid solubility of lithium were stacked together, with the loaded sides of the positive and negative electrodes being separated by the membrane material and the unloaded sides of the current collectors being facing outwards, followed by hot press lamination at 110° C. to form a laminate sheet layer with a "sandwich" structure, as shown in FIG. 4. Then, 15 laminate sheet layers with "sandwich" structure were stacked together by a stacking machine, where the aluminum current collectors of the positive electrodes were attached to each other, and the copper current collectors of the negative electrodes were attached to each other. The tab parts were welded, and packaging was performed with an aluminum plastic film, followed by injecting an ionic liquid electrolyte solution containing LiTFSI and FEC inside the aluminum plastic film under vacuum and heat sealing the aluminum plastic film into a case, to manufacture a high-pressure lithium titanate quasi-solid-state lithium ion battery.

What is claimed is:

1. A method for manufacturing a pre-lithiated polyphenylene sulfide with a high solid solubility of lithium, comprising the following steps:

placing N-methylpyrrolidone (NMP), lithium sulfide ($Li_2S$), and lithium hydroxide (LiOH) into a high-pressure reactor with a stirring function to obtain a first mixture, and heating the first mixture to 150-250° C. for a high-temperature dehydration for 2-5 h, and then cooling the first mixture to 100° C. and adding 1,4-dichlorobenzene (p-DCB) to the first mixture for a first reaction at 150-250° C. for 80-200 min;

dropwise adding hydrochloric acid in an identical amount as an amount of the LiOH on a molar basis to neutralize the LiOH, and removing the NMP and $H_2O$ by an evaporation or sublimation, to obtain a dry mixed powder; and to the dry mixed powder, adding a chloride ion complexing agent to obtain a second mixture, stirring the second mixture to homogeneity, and placing the second mixture in a sealed reactor for a second reaction at 150-250° C. for 80-200 min, followed by washing and drying, to obtain the pre-lithiated polyphenylene sulfide with the high solid solubility of lithium.

2. The method for manufacturing the pre-lithiated polyphenylene sulfide according to claim 1, wherein
the $Li_2S$ is formed by a high-temperature reaction of a lithium metal powder with a sulfur powder or the $Li_2S$ is formed by a carbothermal reduction reaction of lithium sulfate ($Li_2SO_4$).

3. The method for manufacturing the pre-lithiated polyphenylene sulfide according to claim 1, wherein
the NMP, the $Li_2S$, and the LiOH are at a molar ratio of 1-5:1:0.05-0.2.

4. The method for manufacturing the pre-lithiated polyphenylene sulfide according to claim 1, wherein
the $Li_2S$ and the p-DCB are at a molar ratio of 1.3-0.8:1.

5. The method for manufacturing the pre-lithiated polyphenylene sulfide according to claim 1, wherein
the evaporation or sublimation comprises a hot-air drying method, a rotary evaporation method, and a freeze-drying method, to maximize a retention of solid-phase components and only remove the NMP and the $H_2O$.

6. The method for manufacturing the pre-lithiated polyphenylene sulfide according to claim 1, wherein
the chloride ion complexing agent is an organic metal-ion-free complexing agent, and
the chloride ion complexing agent is preferably calix-crown ether, caliximidazole, calixpyrrole, or calixarene.

7. The method for manufacturing the pre-lithiated polyphenylene sulfide according to claim 1, wherein
the chloride ion complexing agent is added in an amount on the molar basis, wherein the amount of the chloride ion complexing agent is 0.01-0.2 times an amount of the p-DCB.

8. A pre-lithiated polyphenylene sulfide prepared by the method according to claim 1.

9. A method for preparing an isotropic polyphenylene sulfide-based solid electrolyte membrane, comprising the following steps:
mixing a pre-lithiated polyphenylene sulfide powder and polytetrafluoroethylene (PTFE) uniformly in a mixer under a temperature condition where the PTFE is in a glassy state, to obtain a mixed powder, and air-grinding the mixed powder with a supersonic gas to allow a molecular chain of the PTFE to extend and open and form a physical adhesion with the pre-lithiated polyphenylene sulfide powder, without a chemical reaction;
then removing the supersonic gas in the mixed powder through an extruder to form a continuous cake-like wide strip, followed by hot pressing the continuous cake-like wide strip into a pre-lithiated polyphenylene sulfide membrane material with a hot roll at a temperature lower than 150° C., and winding the pre-lithiated polyphenylene sulfide membrane material up; and
preparing the isotropic polyphenylene sulfide-based solid electrolyte membrane.

10. The method for preparing the isotropic polyphenylene sulfide-based solid electrolyte membrane according to claim 9, wherein
the pre-lithiated polyphenylene sulfide powder and the PTFE are mixed uniformly in the mixer at a temperature controlled below 10° C. for a mixing time of 0.5-4 h.

11. A polyphenylene sulfide-based solid electrolyte membrane prepared by the method according to claim 9.

12. The polyphenylene sulfide-based solid electrolyte membrane according to claim 11, wherein
the pre-lithiated polyphenylene sulfide powder and the PTFE are mixed uniformly in the mixer at a temperature controlled below 10° C. for a mixing time of 0.5-4 h.

\* \* \* \* \*